June 13, 1972　　　E. L. SMITH ET AL　　　3,669,816
LINING FOR CRYOGENIC TANK
Filed Oct. 1, 1969
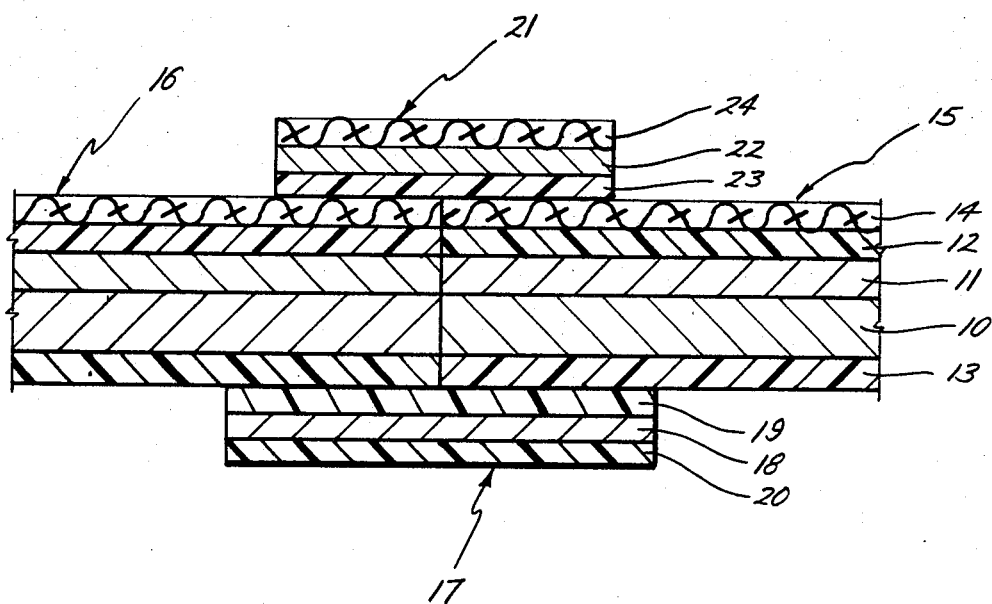
Ernest L. Smith
Arthur R. Duffy
Eugene S. Lyman
INVENTORS
BY
ATTORNEYS United States Patent Office 3,669,816
Patented June 13, 1972

3,669,816
LINING FOR CRYOGENIC TANK
Ernest L. Smith, Shreveport, La., Arthur R. Duffy, Worthington, Ohio, and Eugene S. Lyman, Northfield, Minn., assignors to G. T. Schjeldahl Company, Northfield, Minn.
Continuation-in-part of application Ser. No. 862,788, Oct. 1, 1969. This application Oct. 1, 1969, Ser. No. 862,864
Int. Cl. B32b 15/08, 1/02; B65d 87/34
U.S. Cl. 161—38                                    3 Claims

ABSTRACT OF THE DISCLOSURE

This invention relates to a lining for use in cryogenic tanks wherein sheets of laminate material comprising multiple layers of woven polyethylene terephthalate fibers, aluminum, and stress-oriented polyethylene terephthalate films, are joined by tapes of laminate material comprising layers of like materials to form a lining which is substantially impermeable to liquids and gases at cryogenic temperatures.

BACKGROUND

This patent is a continuation-in-part of our copending application Ser. No. 862,788 for "Liner" filed Oct. 1, 1969.

This invention relates to a lining for use in storage tanks, and particularly to a lining for use in cryogenic storage tanks of substantial size or volume.

In recent years, the natural gas industry has turned to storage of liquefied natural gas in many applications such as for peak shaving. See for instance Pat. No. 3,196,622 to Smith disclosing and illustrating a tank particularly adapted for the storage of liquefied natural gas. As shown in the above referenced Smith patent, such tanks require a lining of some flexible, impermeable material. A laminate sheet material for use in such a lining is shown in the above identified copending application. The liner material therein disclosed constitutes a laminate composed of two layers of aluminum for impermeability and layers of Mylar and Dacron for strength. Such a liner material forms an impermeable barrier to natural gas liquid and vapors, while remaining ductile at cryogenic temperatures.

Reference is made to the Smith patent for a full disclosure of the manner in which the lining will be supported between layers of protective insulation to provide a rugged and impermeable barrier to liquefied natural gas and natural gas vapors which are held in equilibrium at cryogenic temperatures.

It is an object of this invention to provide an impermeable lining for cryogenic storage tanks, and particularly cryogenic storage tanks of substantial size or volume.

Another object is to provide an impermeable, rugged lining for cryogenic storage tanks suitable for containing liquefied natural gas and natural gas vapors which are held in equilibrium.

Another object is to provide an impermeable, rugged lining for cryogenic storage tanks wherein the several sheets of laminate liner material making up the lining are joined by tapes of other laminate material so that the junctures are substantially as strong, flexible, and impermeable as the body of the lining.

Another object of this invention is to provide an impermeable, rugged lining for cryogenic storage tanks comprising sheets of laminate material, joined by tapes of other laminate material, said lining providing a liquid and gaseous impermeable barrier and having adequate strength to resist loads and stresses normally imposed on it during installation and while it is acting as an impermeable barrier, the lining remaining ductile at cryogenic temperatures.

DESCRIPTION OF THE DRAWING AND THE PREFERRED EMBODIMENT

These and other objects and advantages of the invention will become apparent from the following description of an embodiment of the invention which is discussed and explained in conjunction with the accompanying drawing which is a view in cross-section of a portion of a lining constructed in accordance with the present invention, the view being taken at a point where two adjacent sheets of liner material are joined.

The cryogenic tank for liquefied natural gas, or other liquids stored at cryogenic temperatures, must have a liquid-vapor impermeable barrier. Normally in a tank of the type disclosed in the above-referenced Smith patent, the barrier memebr will consist essentially of a lining which is arranged to be free from exposure to structural loads. The lining must, however, be able to withstand exposure to certain secondary loads such as those which occur along and adjacent gaps formed in the insulation member when the insulation member undergoes temperature cycling, and also those gaps which are inadvertently formed due to improper fitting insulation. The lining must also be able to withstand exposure to those accidental impact loads which frequently occur during construction of large storage tanks.

The body of the lining of the present invention comprises a plurality of sheets of laminate liner material constructed in accordance with our above-referred copending application.

In the sheets of laminate liner material, the primary gaseous and liquid impermeable barrier is provided by a sheet or film of aluminum. Preferably, a sheet or film of aluminum 10 is provided, this sheet being approximately 1 mil thick. Aluminum of this thickness with only a very few pin holes formed therein is commercially available. To provide a reliably impermeable barrier of aluminum, a second sheet of aluminum 11 is bonded to the sheet 10 so that the random location of pin holes between the two sheets will virtually eliminate the possibility of two randomly-located holes in the sheets becoming aligned, so as to permit penetration or leakage of vapors or liquids through the liner. In order to maintain the laminate as flexible as possible, the second sheet of aluminum 11 is approximately ½ mil in thickness. Even though there are more holes through the ½ mil sheet than the 1 mil sheet of aluminum, the random location when the two sheets are placed together reduces the probability of complete penetration of the aluminum barrier by alignment of holes through the two separate sheets. As shown, these sheets 10 and 11 of aluminum are positioned side by side.

In order to provide strength for the liner, two layers or films, each approximately ½ mil thick, of stress-oriented polyethylene terephthalate are utilized. Stress-oriented polyethylene terephthalate is commercially available from E. I. du Pont de Nemours Corporation under the name "Mylar." Two approximately ½ mil thick layers 12 and 13 are selected and they are bonded to opposite sides of the two aluminum sheets.

The primary purpose of the stress-oriented polyethylene terephthalate is to provide strength. Two sheets will provide substantially greater strength than a single sheet without sacrificing flexibility.

The stress-oriented polyethylene terephthalate also provides protection for the aluminum sheets against abrasion which could occur as a result of contact between the aluminum and the insulation material of the tank. In addition, the aluminum sheets are protected against damage which could occur during construction of the tank. Hence, this protective film is desirably positioned on both sides of the aluminum. The polyethylene terephthalate film is more readily firmly bondable to the woven fibers of polyethylene terephthalate such as, for example, Dacron sheet such as the sheet 14, and thus a more rugged laminate structure can be obtained.

In order to provide additional strength, and particularly to provide tear resistance, the woven polyethylene terephthate fibers in the form of a layer of approximately 0.8 ounce per square yard cloth 14 is positioned adjacent to one of the layers of polyethylene terephthalate film, preferably on the surface remote from the aluminum layers. This woven polyethylene terephthalate increases the tear resistance of the laminate and also provides good abrasion resistance. It is, therefore, preferred that the woven polyethylene terephthalate fibers be placed in contact with the surface of the tank insulation when the lining is installed in the tank, such as the tank shown in the Smith patent, in the event relative motion occurs between the lining and the tank insulation during thermo cycling. The layer formed of woven polyethylene terephthalate fibers provides substantial impact strength for the laminate. The several layers of aluminum, Dacron and Mylar may be joined together with any desired adhesive which will permit the resulting laminate to remain flexible. For example, a polyester base adhesive consisting of from 40 mole percent to 60 mole percent polyethylene terephthalate, balance polyethylene sebacate, dispersed in a suitable solvent such as trichloroethylene is preferably utilized as an adhesive for bonding the individual layers into a laminate. These adhesives are described in detail in U.S. Pat. No. 2,892,747.

As already indicated, a plurality of such sheets of laminate liner material are joined together to form the actual lining for the tank. Such a juncture is illustrated in the drawing. Two sheets of laminate liner material indicated generally at 15 and 16 are arranged side-by-side with their edges in substantially parallel relationship, preferably substantially abutting, and their surfaces of woven Dacron cloth on a common side of the lining.

A first tape indicated generally at 17 of laminate material is disposed on one side of the sheets 15 and 16. This first tape consists of a thin strip of aluminum 18 approximately ½ mil thick bonded between two films of stress-oriented polyethylene terephthalate 19 and 20, each approximately ½ mil thick. The layer of aluminum 18 forms a substantially impermeable barrier to natural gas liquid and vapors, and the layers of stress-oriented polyethylene terephthalate protect the aluminum from abrasion and lend strength and tear resistance to the tape. The three layers forming the tape may be bonded together with the same adhesive used in bonding the sheets of laminate material as described above.

This first tape 17 is preferably disposed on the side of sheets 15 and 16 having a surface of stress-oriented polyethylene terephthalate film, and is positioned laterally of the juncture of sheets 15 and 16 so as to completely cover the juncture and overlap onto the adjacent sheets 15 and 16.

A second tape indicated generally at 21 of laminate material is disposed on the opposite side of the lining from the first tape. As shown in the drawing, this would be the side of the lining having a surface of woven Dacron material 14. This second tape of laminate consists of a thin strip of aluminum 22 approximately ½ mil thick bonded between a film of stress-oriented polyethylene terephthalate 23 approximately ½ mil thick on the one side, and a layer of woven Dacron cloth 24 (approximately 0.8 ounce per square yard) on the other. The layers may be bonded together, using the same adhesive employed in bonding the laminate liner material and the first laminate tape 17.

The second tape should also be positioned laterally of the juncture of sheets 15 and 16 so as to cover the juncture and overlap onto the sheets 15 and 16. As shown in the drawing, it is preferred that the second tape 21 be placed with its surface of stress-oriented polyethylene terephthalate toward the lining, as this creates a better bond with the lining than would the Dacron layer 24.

The tape joint should be arranged to prevent the edges of the tape from being in alignment as this would weaken the joint. Any desired arrangement may be used. Preferably, the first tape 17 and the second tape 21 are of different widths and are symetrically placed over the liner sheets. This prevents the abrupt change in lining thickness which would occur if the leading or trailing edges of the tapes 17 and 21 were aligned, as they might be if the two tapes were of equal width. Such an abrupt change in lining thickness would make the joint less flexible and more subject to failure, and, therefore, would not be as desirable as the present design. In the drawing tape 17 is shown as the wider of the two, but the choice is arbitrary since the only function in the difference in width is to keep the edges misaligned.

A suitable adhesive, such as that employed in bonding the sheets of laminate liner material, is then disposed between the two sheets 15 and 16 and the tape surfaces adjacent the sheets, and the sheets and tapes are bonded into an integral structure.

A joint is thus created between the adjacent sheets of laminate liner material which seals the juncture against permeation with two layers of aluminum 18 and 22, and provides the strength and tear resistance of three layers of Mylar 19, 20 and 23, and one layer of Dacron cloth 24. Since this is one more layer of Mylar than is present in the sheets of liner material, the joints in the tank lining should be slightly stronger than the body of the lining.

The two ½ mil thick layers of aluminum 18 and 22 combined will not have quite the permeation resistance of the 1 mil and ½ mil combination used in the sheets of liner. However, the possibility of two pin holes in layers 18 and 22 lining up at precisely the point where the sheets 15 and 16 are joined is sufficiently remote to justify using the two ½ mil layers, especially in light of the added flexibility gained at the joint from having only one mil of aluminum in the combined tapes rather than 1 and ½ mil as in the liner.

The layers which form the tank lining retain their ductility and remain relatively flexible at cryogenic temperatures such as those temperatures which occur during the storage of liquefied natural gas and during the extraction or withdrawal of natural gas vapors from the liquefied source held at equilibrium.

The lining has a relatively low coefficient of thermal expansion, this coefficient being equal to or less than that of the insulation utilized in the above-identified Smith patent. Thus, contraction upon cooling from the ambient during construction will permit the lining to become free from the insulation layer. The lining is chemically inert to the presence of gaseous or liquid hydrocarbons and is also highly resistant to thermal cycling and thermoshock at cryogenic temperatures. The lining has a relatively low modulus of elasticity so that reasonably large deflections may occur upon exposure to modest loads, however the lining does not appear to suffer from fatigue. Furthermore, the lining does not appear to deteriorate with age, and accordingly has a long life time.

The foregoing disclosure and description of the invention is illustrative and explanatory thereof, and various changes in the size, shape and materials, as well as in the details of the illustrated construction, may be made within the scope of the appended claims without departing from the spirit of the invention.

What is claimed is:
1. An interior lining for a cryogenic tank comprising:
   (a) a plurality of sheets of laminate material, said sheets being formed of two layers of aluminum adhesively bonded together in side-by-side relationship, one of said aluminum layers being approximately 1 mil thick and the other being ½ mil thick, two films of stress-oriented polyethylene terephthalate, each film being bonded to an exposed outer surface of one of said aluminum sheets and having a thickness of approximately ½ mil, a layer of woven cloth formed of woven polyethylene terephthalate fibers bonded to one of said layers of stress-oriented polyethylene terephthalate film and being disposed on the side of said film which is remote from said aluminum layer, and a film of adhesive disposed adjacent layers comprising said liner bonding said layers into an integral structure; said sheets being disposed adjacent each other with their surfaces of woven cloth on a common side of the lining and their adjacent edges in parallel relationship; and, (b) a plurality of first tapes of laminate material, each consisting of a strip of aluminum approximately ½ mil thick bonded between two films of stress-oriented polyethylene terephthalate each approximately ½ mil thick, disposed adjacent one side of the sheets longitudinally of their junctures in such a manner that the tapes completely cover the junctures; and, (c) a plurality of second tapes of laminate material, each consisting of a strip of aluminum approximately ½ mil thick bonded between a film of stress-oriented polyethylene terephthalate approximately ½ mil thick on the one side and a layer of woven cloth formed of woven polyethylene terephthalate fibers on the other, disposed adjacent the other side of the sheets and extending longitudinally of the junctures of the adjacent sheets, said second tapes having their surfaces of stress-oriented polyethylene terephthalate film toward the sheets and placed to completely cover the junctures of the sheets; and, (d) a film of adhesive material between the sheets and the first and second tapes bonding the sheets and the tapes into an integral structure.

2. An interior lining for a cryogenic tank according to claim 1, wherein said first tapes are disposed on the side of the sheet having a surface of stress-oriented polyethylene terephthalate film and said second tapes are disposed on the side of the sheets having a surface of woven cloth.

3. An interior lining for a cryogenic tank according to claim 1, wherein said first tapes and said second tapes are of different widths and their edges are spaced from each other.

References Cited
UNITED STATES PATENTS

| | | | |
|---|---|---|---|
| 2,759,522 | 8/1956 | Limm | 161—213 |
| 3,196,622 | 7/1965 | Smith et al. | 62—45 |
| 3,203,849 | 8/1965 | Katz et al. | 161—92 |
| 3,328,226 | 6/1967 | Wiley | 161—92 |

FOREIGN PATENTS

| | | | |
|---|---|---|---|
| 245,801 | 11/1959 | Australia | 161—213 |
| 924,636 | 4/1963 | Great Britain | 161—213 |

ROBERT F. BURNETT, Primary Examiner

W. F. FINNEY, Assistant Examiner

U.S. Cl. X.R.

161—39, 92, 98, 214, 231, 402; 220—80, 83